Figure 1:
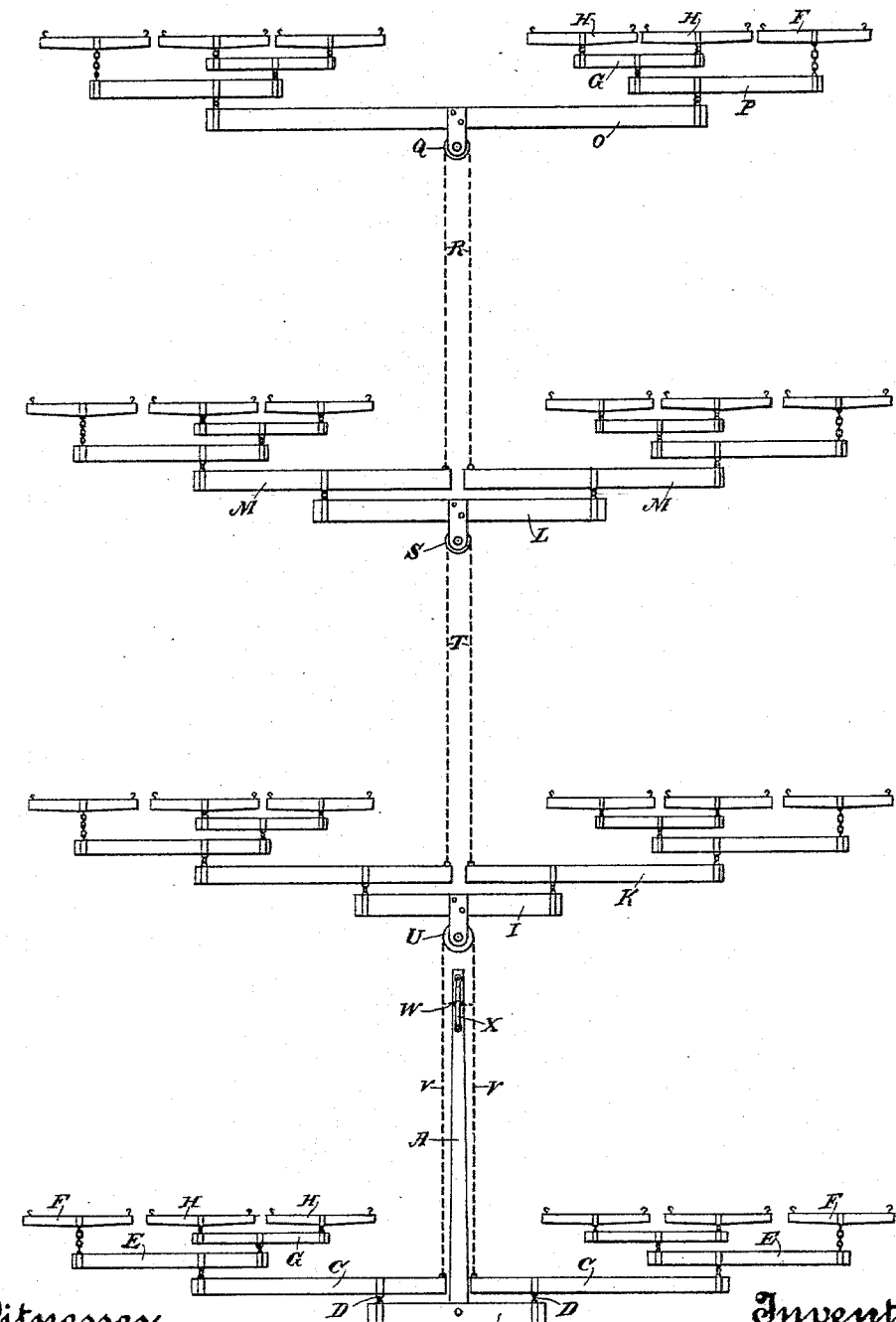

(No Model.) 2 Sheets—Sheet 1.

P. V. SCHANDONEY.
DRAFT EQUALIZER.

No. 490,214. Patented Jan. 17, 1893.

Witnesses,
 G. B. Nurse
 H. F. Ascheck

Inventor,
 Peter V. Schandoney
 By Dewey & Co.
 Attys.

(No Model.) 2 Sheets—Sheet 2.
P. V. SCHANDONEY.
DRAFT EQUALIZER.
No. 490,214. Patented Jan. 17, 1893.
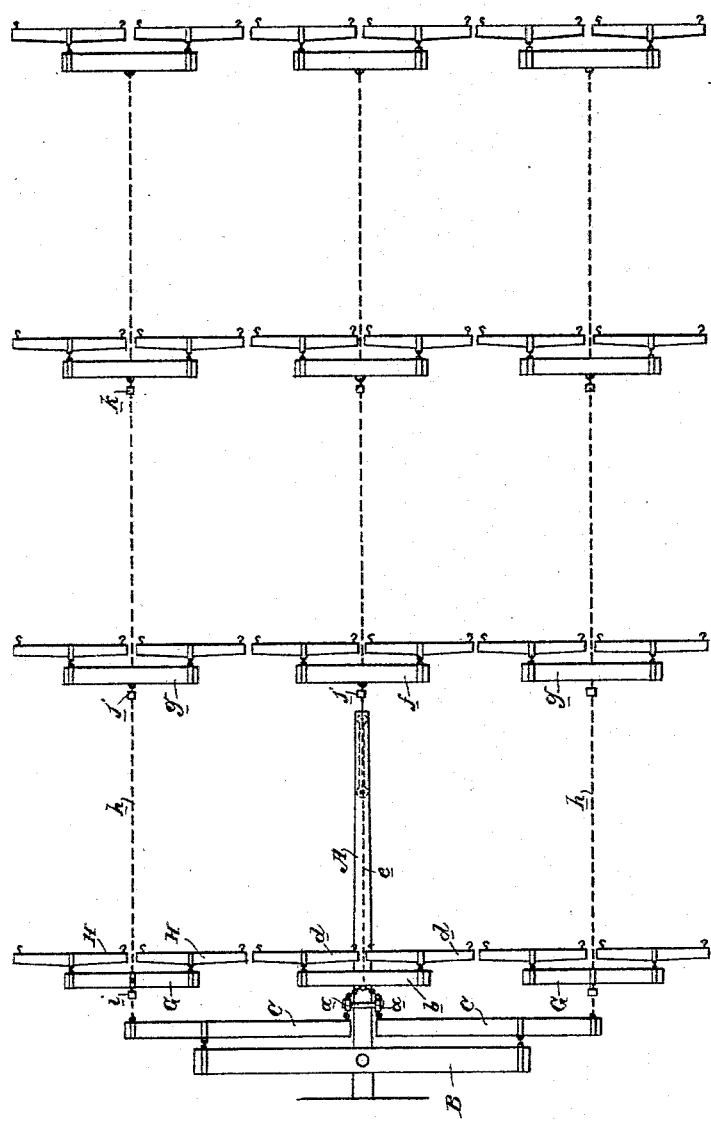
Witnesses,
Inventor,
Peter V. Schandoney
By Dewey & Co.
Attys

UNITED STATES PATENT OFFICE.

PETER V. SCHANDONEY, OF SACRAMENTO, CALIFORNIA.

DRAFT-EQUALIZER.

SPECIFICATION forming part of Letters Patent No. 490,214, dated January 17, 1893.

Application filed September 22, 1892. Serial No. 446,607. (No model.)

*To all whom it may concern:*

Be it known that I, PETER V. SCHANDONEY, a citizen of the United States, residing at Sacramento, Sacramento county, State of California, have invented an Improvement in Draft-Equalizers; and I hereby declare the following to be a full, clear, and exact description of the same.

My invention relates to a novel draft equalizer for vehicles.

It consists of such an arrangement of draft bars with connecting chains between each set of teams which are harnessed one in front of the other, that the draft of all the teams is properly equalized so that they all pull with approximately the same force upon the load to be hauled.

It also consists in certain details of construction which will be more fully explained by reference to the accompanying drawings, in which—

Figure 1 is a plan view showing the arrangement of my equalizing device. Fig. 2 is a modification showing another manner of connecting the teams. Fig. 3 is a side elevation of this device. Fig. 4 is a similar view showing the details of connection about the tongue.

In hauling traveling harvesters upon the field it is customary to attach large teams, consisting of as many as twenty-four or more animals to haul the apparatus. These teams are usually hitched six or eight abreast and in three or more series, one series ahead of another. The attachments are made by means of draft and equalizing bars and single-trees attached to these bars, but as the animals all have different rates of walking, it is impossible to make them all travel alike, and by the means which are now adopted for connecting them with the load, it is equally impossible to bring an equal share of the load upon each animal or series of animals. Some of them being attached directly to the draft bar of the machine, whenever the load is started they pull upon the whole weight of the apparatus, and the strain is very unequally divided.

My invention consists in the employment of connecting chains by which the draft bars are so united as to yield to irregular pulls by different parts of the team, and thus counterbalance these pulls and practically divide the draft equally among all the animals of the team.

A represents the pole of the apparatus having a draft bar B centrally pivoted near its rear end. To the outer ends of this draft bar are attached equalizing bars C. The present arrangement I have shown adapted for a team of twenty-four horses arranged in series of six. The equalizing bars C are connected with the draft bar B by the usual swivel connections at D. The points at which these bars are connected with the draft bar are such that the proportion between the part inside of the connection D to that which is outside is as one to three. To the outer ends of the equalizing bars C are similarly connected equalizing bars E, the proportion projecting outward to that which projects toward the pole from the point of attachment being as two to one.

To the outer end of the equalizing bar E is connected a singletree F, and to the inner end of this bar is connected a doubletree G, the ends of which project equally from the point of attachment. To the outer ends of this doubletree are connected singletrees H. By this arrangement it will be seen that a single horse is attached by means of the singletree F to the outer end of the equalizing bar E while two horses are connected through the singletrees H and the doubletree G with the inner end of the equalizing bar E, and as the proportion of the bar E which projects outward from its point of attachment is twice as long as that which projects inwardly, it will be seen that the pair of horses pulling upon the inner end will counterbalance the pull of the single horse pulling upon the outer end. The same arrangement is made upon each side of the tongue so that there will be a line of six horses at this point. At a sufficient distance in front of this series is another draft bar I having a similar arrangement of equalizing bars K connected with its outer end, and the single and double-trees connected with it in a similar manner to those previously described for another team of six horses. In front of this again is another equalizing draft bar L with its equalizing bars M, M' and double and single-trees arranged in the same manner for another series of six. A final series of six horses are connected with a draft bar O having the equalizing bars P connected with each end, and double and single-trees by which three horses are connected with each end of this draft bar, thus making up the whole team of twenty-four horses. In order to equalize the draft of these teams, I have shown the draft bar O having a suitable strap attachment to its center for the support of a pulley Q. Around this pulley passes a chain R which extends back and the rear ends of the chain are connected with the inner ends of the equalizing bars M. It will be seen from this arrangement that when the front team of six horses commence pulling, their power will be applied directly through the chain R upon the inner ends of the equalizing bars M. These bars I have shown made five feet in length, and their centers are connected with the draft bar L. Now, as there are three horses connected with the outer ends of each of the bars M it will be seen that the pull of the whole of these six horses is counteracted by the pull of the six horses in front acting through the chain R upon the inner ends of these swiveled equalizing bars L. It will also be seen that whatever irregularities of pull there may be between the two series, will be equalized by the swivel of the bars M, the ends of which may temporarily advance or recede according to the greater amount of pull of one team or the other.

To the center of the draft bar L is pivoted another pulley S around which passes a chain T in the same manner as described for the chain R.

The ends of the chain connect with the inner ends of the swiveled equalizing bars K. Now, as each of these equalizing bars is connected with the draft bar I, and each of them has three horses connected with it, making six in a series, it will be manifest that the pull of these six horses must counterbalance the pull of the twelve horses in the two series in front, the whole of the power of which is applied to the draft bar L. In order to do this I have shown the equalizing bars K connected with the ends of the draft bar I so that the outer projecting ends of these bars bear the proportion to the inner ends of two to one. The object of this will be readily understood when it is seen that only six horses are attached to pull upon the outer ends of these bars, while the chain T connecting with the inner ends represents the pull of twelve horses. By this construction the pull of all three of these series is again equalized as described for the first two series.

A pulley U is pivoted to the center of the draft bar I and chains V extend backwardly from it and connect with the inner ends of the equalizing bars C. As the team or series of six horses which are attached to the outer ends of the equalizing bars C, as before described have now to pull against three teams of six horses each which are situated ahead of them, it will be seen that the proportion of the outer to the inner ends of the bars C must be as three to one, and this again enables the six horses which are attached to the outer ends of the equalizing bars C to counterbalance the pull of the three series of six which are attached in front of them.

The draft bar B is swiveled across the tongue A and its ends have a certain amount of forward and back motion to adjust it to irregularity of pull while equalizing bars C have a similar motion to accommodate them to any irregularity in the pull of the different teams in front. A short transverse chain W connects the two sides of the chain V, and it is guided by a rod X fixed upon the top of the front end of the pole so that a link of the chain slides upon it. By this construction I am enabled to equalize the work of any number of series or teams of horses which are connected in this manner, and to relieve all of the horses so that they pull only their proper proportion of the load.

In some forms of draft mechanism for hauling this class of machines, it has been customary to attach the doubletrees to the outer ends of the draft bar B, and a doubletree directly across the pole in the center. The doubletree having two singletrees upon its ends will thus give a team of six horses, but while the four outer horses have a certain amount of relief on account of the swiveling of the draft bar upon the pole, the two inner horses which are connected directly with the pole have the whole weight of the machine upon them in starting, and in heavy pulls, or if by any reason the four outer horses should temporarily slacken in their work; and as the teams are connected in this way right through to the front, the same objection would hold in a team of twenty-four horses.

Fig. 2 which shows the modification of my invention, shows it as applied to this form of of attachment where the equalizing bars C are attached to the ends of the draft bar B with the inner ends twice as long as the outer ends. A doubletree G is attached to each of the outer ends and the singletrees H H are attached to the ends of these doubletrees, the longer inner ends of the equalizing bars C are connected by short bars $a$ situated above and below the tongue A. The upper bar $a$ is connected directly with the doubletree $b$ and this has singletrees $d$ attached to its ends for the attachment of two horses, making a series of six as before described. In this arrangement I have shown a chain $e$ connected with the lower of the bars $a$ and extending beneath the pole to the front end where it connects with a doubletree $f$ which is in line in front of the central team. The two outside doubletrees $g$ are similarly connected by chains $h$ and by this arrangement the pull of the teams when hitched up in this manner are similarly balanced and equalized. The connection of the chains $h$ with the doubletrees is made as shown in the side view, Fig. 3, by means of short levers $i$ which are fulcrumed in proportion to the number of teams pulling in line with the direction of travel, as, for instance, the first short lever $i$ which may be a foot long, would be fulcrumed to the doubletree G with the proportion of three above the point of connection, and one below. The upper end is, as before described, connected for the pull of one pair of horses. The second lever $j$ in front would be fulcrumed similarly in the proportion of two to one, and the lever $k$ will be fulcrumed so that it has equal lengths above and below its fulcrum points because the teams in advance of these are equal in number.

Having thus described my invention, what I claim as new and desire to secure by Letters Patent is—

A draft equalizer consisting of draft bars, the rearmost one of which is fulcrumed to the tongue of the vehicle, equalizing bars connected with the ends of the draft bar, double and single trees for the attachment of teams of horses in parallel series, one or more draft bars situated in front of the first one with corresponding equalizing bars, double-trees and singletrees for the attachment of one or more series of horses, and one or more chains extending from the draft bars in front and connecting with the inner ends of the equalizing levers next adjacent and in the rear of said draft bars, substantially as herein described.

In witness whereof I have hereunto set my hand.

PETER V. SCHANDONEY.

Witnesses:
S. H. NOURSE,
J. A. BAYLESS.